J. V. D. ELDREDGE.

Take-Ups for Sewing-Machines.

No. 6,087. Reissued Oct. 13, 1874.

Witnesses
H. C. Clark
R. M. Lyer

Inventor
John V. D. Eldredge
By Dzer. Beadle & Co
Att'ys.

THE GRAPHIC CO. PHOTO-LITH. 39 & 41 PARK PLACE, N.Y.

BEST AVAILABLE COPY

UNITED STATES PATENT OFFICE.

JOHN V. D. ELDREDGE, OF DETROIT, MICHIGAN.

IMPROVEMENT IN TAKE-UPS FOR SEWING-MACHINES.

Specification forming part of Letters Patent No. 84,099, dated November 17, 1868; reissue No. 6,087, dated October 13, 1874; application filed September 15, 1873.

*To all whom it may concern:*

Be it known that I, JOHN V. D. ELDREDGE, of Detroit, in the county of Wayne and State of Michigan, have invented an Improvement in Take-Up for Sewing-Machines, of which the following is a specification:

The object of this invention is to so construct what is usually denominated the "take-up" in shuttle-sewing machines that a loop will always be formed, under the plate, through which the shuttle passes, to complete the stitch, thereby preventing the frequent breaking of the thread, caused by the strain upon it while the shuttle is passing or attempting to pass through the loop. The employment of this take-up will also prevent, when the machine is being employed upon thick stuffs, the kinking of the thread above the article being worked upon.

Figure 1:
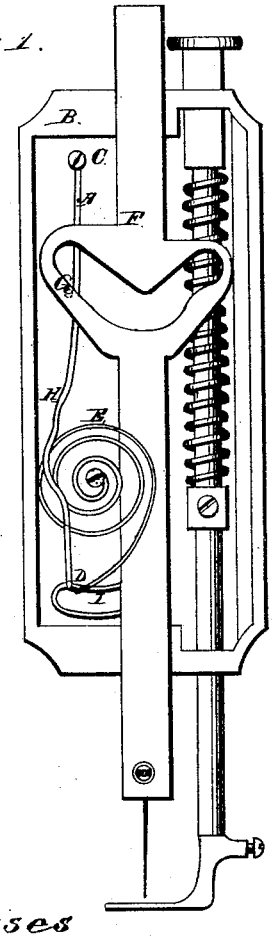
Figure 2:
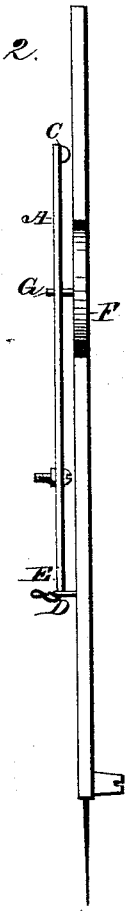

Figure 1 is a view of the rear of the face-plate of a sewing-machine, with my attachment. Fig. 2 is a side elevation of the needle-bar, showing its connections.

The same letters refer to like parts in each figure.

In the accompanying drawings, A is an arm or spring-lever, secured to the inner face of the face-plate B, at or near the upper end of said face-plate, by means of the screw or rivet C. The lower end of this arm is provided with a projecture, D, which engages with the spring take-up E, which is provided with a small eye or loop, *a*, through which the thread is passed. The needle-bar F is provided with a pin or projection, G, which, in its reciprocating motion with said bar, engages with the curve H in the arm A, and moves forward the lower end of said arm, the projection D of which traverses in the slot I, and when the needle-bar rises the forward movement of said arm is reversed. This movement prevents the strain upon the thread, which, in all other devices for this purpose used in straight-needle machines, is caused by the thread being obliged to operate the "take-up," as the shuttle in passing through the loop is compelled to draw the thread through the cloth, and bring the take-up to its position.

It will readily be seen that by my improvement the forward movement of the take-up is compelled by the projection or pin G, engaging with the curve H in the arm A, thereby slackening the thread which passes through the loop *a* on the spring E, so that all the shuttle is compelled to do in passing through the loop is to draw the thread through the stuff being operated upon. After the shuttle has so passed through the loop the arm A returns to its original position.

I am aware that devices for taking up the slack of the thread, outside the face-plate, and operated by means of an arm or pin projecting at right angles from the edge of the reciprocating needle-bar, through a slot in the edge of the face-plate, corresponding in length to the length of the stroke of the needle-bar, have been employed. I make no claim to the invention of any of these devices; but What I do claim as my invention, and desire to secure by Letters Patent, is—

1. In combination, for the purpose of operating a take-up in sewing-machines, a reciprocating needle-bar, having a pin upon its face, a spring-lever with a curve, the pin upon the needle-bar giving the spring-lever a movement in one direction only, by contact with the curve aforesaid, and a face-plate with a transverse slot, in which the take-up has a lateral movement, the needle-bar, the pin upon it, and the spring-lever being inclosed within the face-plate, substantially as described.

2. The arrangement of the needle-bar F, provided with pin G, face-plate B provided with slot I, take-up spring E, and arm A, with the curve H and projection D, when the parts are combined to operate substantially as and for the purposes set forth.

JOHN V. D. ELDREDGE.

Witnesses:

THOS. S. SPRAGUE,

H. S. SPRAGUE.